(No Model.)
C. W. LAWRIE.
SHAFT COUPLING.
No. 308,777. Patented Dec. 2, 1884.
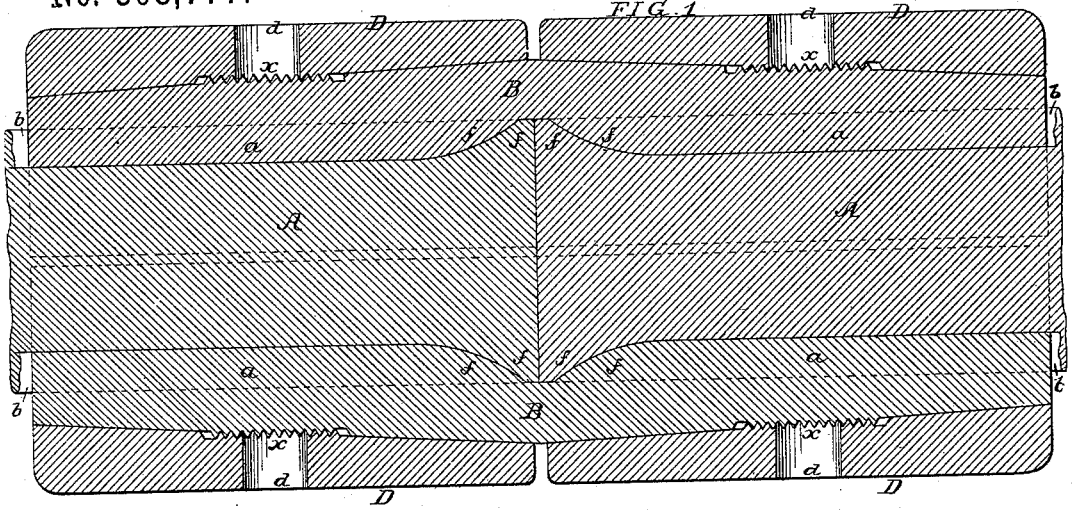
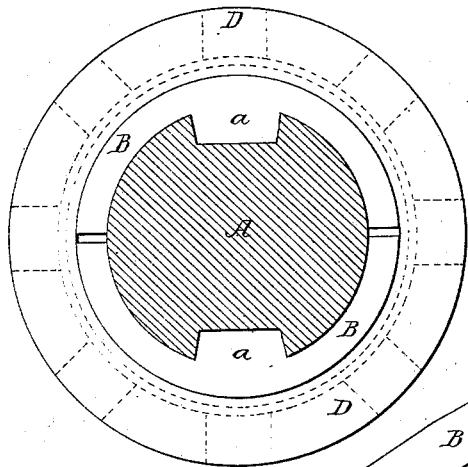
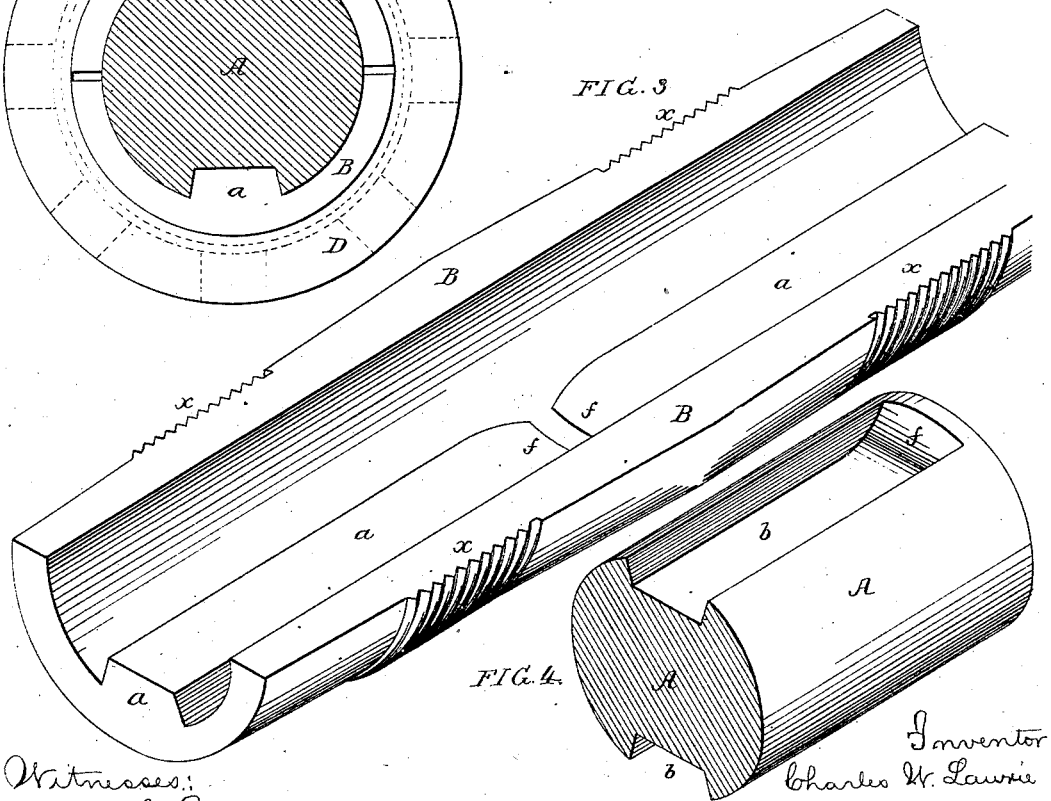
Witnesses:
John E. Paxter
James F. Tobins
Inventor
Charles W. Lawrie
by his Attys
Howson & Sons

UNITED STATES PATENT OFFICE.

CHARLES W. LAWRIE, OF WILMINGTON, DELAWARE.

SHAFT-COUPLING.

SPECIFICATION forming part of Letters Patent No. 308,777, dated December 2, 1884.

Application filed May 10, 1884. (No model.)

*To all whom it may concern:*

Be it known that I, CHARLES W. LAWRIE, a citizen of the United States, and a resident of Wilmington, New Castle county, Delaware, have invented certain Improvements in Shaft-Couplings, of which the following is a specification.

The object of my invention is to produce a strong and secure coupling for the adjoining ends of shafts; and this object I attain in the manner hereinafter set forth, reference being had to the accompanying drawings, in which—

Figure 1 is a longitudinal section of my improved shaft-coupling; Fig. 2, an end view of the same; Fig. 3, a perspective view of one of the coupling-clamps, and Fig. 4 a perspective view of the end of one of the shafts.

A A represent the ends of two shafts which are to be coupled together, and B B two semi-circular clamps which embrace the ends of the shafts, each clamp having in the present instance an internal rib or key, $a$, integral with it, and adapted to key-seats $b$, formed in the shafts. In practice but one of the clamps may have this rib, and the key-seats may be formed in one side of each shaft only, instead of on both sides; but the construction shown is preferred. The outer face of each clamp is tapered from the center toward each end, the continuity of each taper being interrupted near its center by the screw-thread $x$. The clamps B are confined to the shafts A by means of sleeves D, which are tapered and threaded internally for adaptation to the opposite tapered and threaded ends of the clamps, and are provided with openings $d$ for the reception of the pin of a spanner, or are otherwise constructed for operation by means of a suitable wrench, so that on screwing up these sleeves they will contract the clamps to the shafts. The key-seats in each shaft are formed therein by means of a milling-tool, and are discontinued some distance from the end of the shaft, and the keys $a$ of the clamps are recessed at and near the center, so that shoulders $f$ are formed to prevent the longitudinal displacement of the shafts. (See Figs. 1, 3, and 4.)

Both the clamps and sleeves forming part of my improved coupling are made of wrought-iron or low-carbon steel, instead of cast-iron, as usual, this being one of the features of my invention, as it enables me to make a strong and secure coupling of as light and compact a character as possible.

The clamps B are preferably formed by rolling a bar of the desired cross-sectional shape, and then forming the exterior tapers and threads thereon in a lathe, leaving the inner face of the bar, with its keys, as finished by the rolls, although the clamps, with their keys, may, if desired, be die-forged, instead of rolled.

I claim as my invention—

1. The combination of the shafts having key-seats $b$, the externally-tapered clamps B, having internal keys, $a$, adapted to the seats and integral with the clamps, and the internally-tapered sleeves D, adapted to the clamps, as set forth.

2. The within-described clamp for a shaft-coupling, said clamp consisting of a segment of wrought-iron or low steel tapered on the outside, and having a rolled or forged internal surface with rib $a$, as set forth.

3. The combination of the shafts having key-seats $b$, which terminate before reaching the ends of the shafts, with the clamps B, having recessed keys $a$, as set forth.

4. The combination of the shafts with the clamps B B and confining-sleeves D, made of wrought-iron or low steel, as set forth.

In testimony whereof I have signed my name to this specification in the presence of two subscribing witnesses.

CHARLES W. LAWRIE.

Witnesses:
W. H. WALLACE,
C. A. BRINDLEY.